Patented Dec. 26, 1950

2,535,276

UNITED STATES PATENT OFFICE 2,535,276

RHODANIC ACID AND OXARHODANIC ACID DERIVATIVES

Harry Derek Edwards and John David Kendall, Ilford, England, assignors to Ilford Limited, Ilford, Essex, England, a British company No Drawing. Application January 2, 1948, Serial No. 379. In Great Britain January 9, 1947

13 Claims. (Cl. 260—302)

This invention relates to the production of new organic compounds which serve as intermediates in the preparation of dyestuffs.

According to this invention an alkali metal salt of a compound of the general formula:

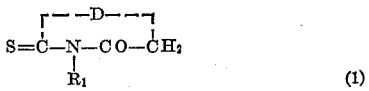

(1)

where D is an oxygen atom or a sulphur atom and $R_1$ is a hydrocarbon group, is reacted with carbon disulphide under substantially anhydrous conditions and the resultant product is reacted with an alkylating agent, or an aralkylating agent, i. e. an alkyl or aralkyl salt or ester.

The compounds of Formula 1 are the N-hydrocarbon-substituted derivatives of rhodanic acid and of oxarhodanic acid (which is 2-thio-4-keto-tetrahydro-oxazole).

In United States Patent No. 2,334,711 a process is described wherein an alkyl or aralkyl quaternary salt of a heterocyclic nitrogen compound containing a reactive methyl group or a monoalkyl-substituted methyl group in $\alpha$ or $\gamma$ position to the quaternary nitrogen atom is reacted, in the presence of a base and a solvent, with carbon disulphide. Compounds of general Formula 1 above will not react with carbon disulphide under the conditions specified in that specification, and it is essential, according to the present invention, that an alkali metal salt of a compound of general Formula 1 be employed and that the reaction be effected under substantially anhydrous conditions.

The course of the reaction is believed to be as follows:

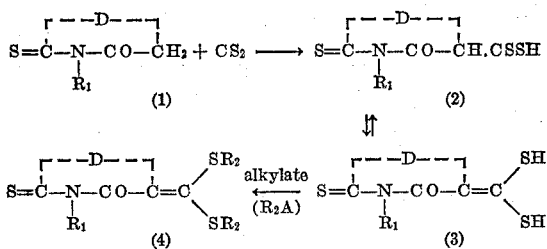

In the above formulae $R_2$ is an alkyl or aralkyl group and A is an acid radicle. Further, it is to be understood that the original heterocyclic compound (1) is used as the alkali-metal salt, the alkali metal replacing one of the hydrogen atoms of the $CH_2$ group. Sufficient alkali must be present in the reaction medium to enable both the hydrogen atoms of the —SH groups of compound (3) to be replaced by alkali-metal and hence by alkyl or aralkyl groups $R_2$.

The alkali salt employed is preferably a sodium salt but other alkali-metal salts, e. g. potassium or lithium salts, may be employed.

$R_1$ may be an alkyl group, e. g. methyl, ethyl or higher alkyl, or an aralkyl group, e. g. benzyl, or an aryl group, e. g. phenyl.

The alkyl or aralkyl salt or ester employed may be, for example, a methyl, ethyl or higher alkyl (for example containing 5-18 carbon atoms) or benzyl sulphate, chloride, bromide, iodide or p-toluene sulphonate. Lower alkyl halides are preferred.

The following examples serve to illustrate the invention, but are not to be regarded as limiting the invention in any way:

EXAMPLE 1

Preparation of 2-thio-3-methyl-4-keto-5-di-(methylthio)-methylene tetrahydrothiazole of the formula

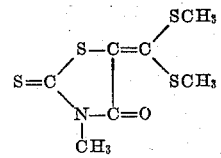

Two molecular equivalents of powdered sodium were covered with anhydrous diethyl ether and 1 molecular equivalent of N-methyl rhodanic acid was stirred in. The mixture was boiled gently under reflux for 48 hours and then allowed to stand for 24 hours. One molecular equivalent of anhydrous carbon disulphide was added and the mixture allowed to stand for 7 days. Two molecular equivalents of methyl iodide were then added and the mixture boiled gently for 48 hours. The reaction mixture was then cooled, filtered and the filtrate concentrated. The residue, on recrystallisation from ethyl alcohol solution twice, yielded the product as shining brown crystals, melting point 115° C.

Analysis:
Found: Nitrogen 5.66%, sulphur 50.8%.
Calculated: Nitrogen 5.57%, sulphur 51.0%.

EXAMPLE 2

Preparation of 2-thio-3-ethyl-4-keto-5-di(methylthio)-methylene tetrahydro-oxazole of the formula

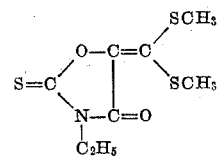

Two molecular equivalents of powdered sodium were covered with anhydrous ether and 1 molecular equivalent of N-ethyl oxarhodanic acid was added. The mixture was warmed gently and stirred for two days. One molecular equivalent of anhydrous carbon disulphide was added at room temperature and the reaction mixture was left for a week with occasional vigorous stirring. Two molecular equivalents of methyl iodide were added and the mixture boiled gently under reflux for two days. It was then filtered and the etheriol filtrate was concentrated and distilled at 4.0 mm. pressure. The required compound distilled at 215° C./4 mm.

The products of this invention have utility as dyestuff intermediates, for example in the processes described in co-pending application Serial No. 380, now U. S. Patent 2,531,973, corresponding to British application No. 771/47, filed on even date herewith.

What we claim is:

1. Process for the production of dyestuff intermediates which comprises reacting with carbon disulphide under substantially anhydrous conditions an alkali-metal salt of a compound selected from the class consisting of the N-hydrocarbon-substituted derivatives of rhodanic acid and of oxarhodanic acid and reacting the resulting product with a compound selected from the class consisting of the 1 to 18 carbon atom alkyl and benzyl sulfates, chlorides, bromides, iodides and p-toluene sulfonates.

2. Process for the production of dyestuff intermediates which comprises reacting with carbon disulphide under substantially anhydrous conditions an alkali-metal salt of a compound selected from the class consisting of the N-hydrocarbon-substituted derivatives of rhodanic acid and of oxarhodanic acid, the reaction mixture containing at least two molecular equivalents of alkali-metal per molecular equivalent of the said compound, and reacting the resulting product with a compound selected from the class consisting of the 1 to 18 carbon atom alkyl and benzyl sulfates, chlorides, bromides, iodides and p-toluene sulfonates.

3. Process for the production of dyestuff intermediates which comprises reacting with carbon disulphide under substantially anhydrous conditions a sodium salt of a compound selected from the class consisting of the N-hydrocarbon-substituted derivatives of rhodanic acid and of oxarhodanic acid and reacting the resulting product with a compound selected from the class consisting of the 1 to 18 carbon atom alkyl and benzyl sulfates, chlorides, bromides, iodides and p-toluene sulfonates.

4. Process for the production of dyestuff intermediates which comprises reacting with carbon disulphide under substantially anhydrous conditions a sodium salt of a compound selected from the class consisting of the N-hydrocarbon-substituted derivatives of rhodanic acid and of oxarhodanic acid, the reaction mixture containing at least two molecular equivalents of alkali-metal per molecular equivalent of the said compound, and reacting the resulting product with a compound selected from the class consisting of the 1 to 18 carbon atom alkyl and benzyl sulfates, chlorides, bromides, iodides and p-toluene sulfonates.

5. Process for the production of dyestuff intermediates which comprises reacting with carbon disulphide under substantially anhydrous conditions an alkali metal salt of a compound selected from the class consisting of the N-hydrocarbon-substituted derivatives of rhodanic acid and of oxarhodanic acid, and reacting the resulting product with a lower alkyl halide.

6. Process for the production of dyestuff intermediates which comprises reacting with carbon disulphide under substantially anhydrous conditions an alkali metal salt of a compound selected from the class consisting of the N-hydrocarbon-substituted derivatives of rhodanic acid and of oxarhodanic acid, the reaction mixture containing at least 2 molecular equivalents of alkali metal per molecular equivalent of the said compound, and reacting the resulting product with a lower alkyl halide.

7. Process for the production of dyestuff intermediates which comprises reacting with carbon disulphide under substantially anhydrous conditions a sodium salt of a compound selected from the class consisting of the N-hydrocarbon-substituted derivatives of rhodanic acid and of oxarhodanic acid, and reacting the resulting product with a lower alkyl iodide.

8. Process for the production of dyestuff intermediates which comprises reacting with carbon disulphide under substantial anhydrous conditions a sodium salt of a compound selected from the class consisting of the N-hydrocarbon-substituted derivatives of rhodanic acid and of oxarhodanic acid, the reaction mixture containing at least two molecular equivalents of alkali metal per molecular equivalent of the said compound, and reacting the resulting product with a lower alkyl iodide.

9. A compound conforming to the general formula:

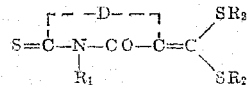

where D is selected from the class consisting of the oxygen atom and the sulphur atom, $R_1$ is a hydrocarbon group and $R_2$ is an alkyl group.

10. The compound 2-thio-3-alkyl-4-keto-5-di(methylthio)-methylene tetrahydrothiazole.

11. The compound 2-thio-3-alkyl-4-keto-5-di(methylthio)-methylene tetrahydro-oxazole.

12. The compound 2-thio-3-methyl-4-keto-5-di(methylthio)-methylene tetrahydrothiazole.

13. The compound 2-thio-3-ethyl-4-keto-5-di(methylthio)-methylene tetrahydro-oxazole.

HARRY DEREK EDWARDS.
JOHN DAVID KENDALL.

REFERENCES CITED

The following references are of record in the file of this patent:

UNITED STATES PATENTS

| Number | Name | Date |
|---|---|---|
| 2,334,711 | Kendall | Nov. 23, 1943 |
| 2,397,013 | Kendall | Mar. 19, 1946 |